United States Patent [19]
Woollenweber et al.

[11] Patent Number: 6,062,026
[45] Date of Patent: May 16, 2000

[54] TURBOCHARGING SYSTEMS FOR INTERNAL COMBUSTION ENGINES

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 08/866,597

[22] Filed: May 30, 1997

[51] Int. Cl.⁷ ............................ F02B 37/10; F02M 25/07
[52] U.S. Cl. ............................................. 60/605.2; 60/612
[58] Field of Search ........................ 60/608, 612, 605.2; 123/571

[56] References Cited

U.S. PATENT DOCUMENTS

| | | | |
|---|---|---|---|
| 2,078,499 | 4/1937 | Ljungstrom | 123/170 |
| 2,173,489 | 9/1939 | Voigt | 308/77 |
| 2,578,785 | 12/1951 | Davis | 230/209 |
| 2,649,048 | 8/1953 | Pezzillo et al. | 103/87 |
| 2,782,721 | 2/1957 | White | 103/87 |
| 2,829,286 | 4/1958 | Britz | 310/53 |
| 3,163,790 | 12/1964 | White | 310/54 |
| 3,557,549 | 1/1971 | Webster | 60/13 |
| 3,572,982 | 3/1971 | Kozdon | 417/423 |
| 4,445,337 | 5/1984 | McCreary | 60/608 |
| 4,453,381 | 6/1984 | Dinger | 60/612 |
| 4,565,505 | 1/1986 | Woollenweber | 417/407 |

(List continued on next page.)

FOREIGN PATENT DOCUMENTS

| | | |
|---|---|---|
| 295985 | 12/1988 | European Pat. Off. . |
| 367406 | 5/1990 | European Pat. Off. . |
| 2479899 | 10/1981 | France . |
| 57-212331 | 12/1982 | Japan . |
| 58-222919 | 12/1983 | Japan . |
| 59-49323 | 3/1984 | Japan . |
| 63-16130 | 1/1988 | Japan ............................ 60/612 |
| 3-37318 | 2/1991 | Japan ............................ 60/605.2 |
| 3202633 | 9/1991 | Japan . |
| 4-112921 | 4/1992 | Japan . |
| 5-5419 | 1/1993 | Japan . |
| 267149 | 8/1927 | United Kingdom . |
| 308585 | 3/1929 | United Kingdom . |
| 1551833 | 9/1979 | United Kingdom ............. 60/612 |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F. J. Wallace, et al.

*Primary Examiner*—Michael Koczo
*Attorney, Agent, or Firm*—Brinks Hofer Gilson & Lione

[57] ABSTRACT

Internal combustion engine systems can be provided with enhanced engine performance through improved two-stage charge air compression and through improved exhaust gas recirculation in relation to engine load and speed. Improved two-stage charge air compression can be provided with a turbocharger having an exhaust gas turbine and a first stage air compressor driven by the exhaust gas turbine and providing a flow of compressed air at its outlet and a second stage motor-driven compressor having its inlet connected with the flow of compressed air from the turbocharger compressor outlet and its outlet connected with the intake manifold to provide further and highly compressed charge air for the internal combustion engine. Improved exhaust gas recirculation can be provided with a two-input proportioning gas control valve connected in a two-stage charge air compression system to mix in controlled proportions a flow of air, which is preferably compressed air from a first stage compressor, and a flow of exhaust gas from the internal combustion engine and to deliver an EGR mixture of exhaust gas and air for compression as charge air for the engine. A control can be provided with engine operating signals and a signal from an EGR mixture sensor and can control the two-input proportioning valve and one or more motor-driven charge air compressors to provide an optimal EGR charge air mixture and to improve engine operating performance.

19 Claims, 6 Drawing Sheets

U.S. PATENT DOCUMENTS

| | | | |
|---|---|---|---|
| 4,641,977 | 2/1987 | Woollenweber | 384/99 |
| 4,708,095 | 11/1987 | Luterek | 123/41.42 |
| 4,708,602 | 11/1987 | McEachern, Jr. et al. | 417/407 |
| 4,776,168 | 10/1988 | Woollenweber | 60/602 |
| 4,827,170 | 5/1989 | Kawamura et al. | 310/156 |
| 4,850,193 | 7/1989 | Kawamura | 60/608 |
| 4,878,347 | 11/1989 | Kawamura | 60/608 |
| 4,882,905 | 11/1989 | Kawamura | 60/608 |
| 4,885,911 | 12/1989 | Woollenweber et al. | 60/597 |
| 4,894,991 | 1/1990 | Kawamura | 60/608 |
| 4,901,530 | 2/1990 | Kawamura | 60/608 |
| 4,918,923 | 4/1990 | Woollenweber et al. | 60/614 |
| 4,935,656 | 6/1990 | Kawamura | 310/156 |
| 4,955,199 | 9/1990 | Kawamura | 60/608 |
| 4,958,497 | 9/1990 | Kawamura | 60/608 |
| 4,958,708 | 9/1990 | Kawamura | 192/0.098 |
| 4,981,017 | 1/1991 | Hara et al. | 60/608 |
| 4,998,951 | 3/1991 | Kawamura | 60/608 |
| 5,025,629 | 6/1991 | Woollenweber | 60/600 |
| 5,038,566 | 8/1991 | Hara | 60/608 |
| 5,074,115 | 12/1991 | Kawamura | 60/608 |
| 5,088,286 | 2/1992 | Muraji | 60/608 |
| 5,094,587 | 3/1992 | Woollenweber | 417/107 |
| 5,121,605 | 6/1992 | Oda et al. | 60/608 |
| 5,176,509 | 1/1993 | Schmider et al. | 417/423.7 |
| 5,406,979 | 4/1995 | Kawamura | 60/608 |
| 5,560,208 | 10/1996 | Halimi et al. | 60/608 |
| 5,605,045 | 2/1997 | Halimi et al. | 60/607 |

TURBOCHARGING SYSTEMS FOR INTERNAL COMBUSTION ENGINES

FIELD OF THE INVENTION

This invention relates generally to internal combustion engine systems for improving the low-speed performance of internal combustion engines and for lowering objectionable engine emissions.

BACKGROUND OF THE INVENTION

Increasing the power output of a given size internal combustion engine, e.g., a diesel engine, by supercharging has been common practice for decades. Turbocharging has evolved as a preferred method because of its utilization of exhaust gas energy to drive a compressor rather than mechanically connecting the compressor to the engine. Turbocharging results in lower fuel consumption, higher power output potential, and compensation for air density loss when engines are operated at high altitude.

The capability of modern engines to produce more power from a given cylinder displacement has been steadily increased due to engineering innovation and development, and modern engines can utilize higher charge air pressures than a single turbocharger can provide. Thus, a number of high specific power diesel engines employ two turbochargers with their turbines and their compressors connected in series. In a typical arrangement of series turbochargers, one turbocharger is mounted on the exhaust manifold and comprises a high pressure stage, and a second turbocharger comprises a low pressure stage. The turbine of the high pressure stage receives exhaust gas from the manifold and the low pressure stage turbine receives exhaust gas from the high pressure stage and discharges it to the atmosphere. The low pressure stage compressor takes in air from the atmosphere, compresses it, and delivers it to the high pressure stage compressor, sometimes through a charge air cooler. The high pressure compressor stage accomplishes a second stage of charge air compression before delivering the charge air to the intake manifold. The two turbochargers in series present a complicated and expensive means of supplying highly compressed air to an internal combustion engine.

In the near future, heavy-duty engines will be required to meet lower levels of nitrogen oxide (NOx), hydrocarbon (HC) and particulate emissions. Proposals for future emissions regulations are calling for stricter nitrogen oxide while keeping particulate matter standards at their current level. In June of 1996, the EPA proposed a plan for reducing pollution from heavy trucks, which calls for NOx+HC emissions of 2.5 G/BHP-HR and particulate matter of 0.10 G/BHP-HR by 2004.

One method of reducing NOx emissions is exhaust gas recirculation, a technique used in some light-duty diesels and in passenger car gasoline engines. Exhaust gas recirculation (frequently referred to as "EGR") reduces NOx in internal combustion engines by diluting the charge air and depressing the maximum temperature reached during combustion. However, a detrimental effect of EGR is a resulting increase in particulates. Government regulations dictate that particulate emissions must be reduced to a level of 0.10 G/BHP-HR by the year 2004.

Particle traps have been used in dealing with the insoluble diesel particulate problem. This method of diesel exhaust after treatment has been traditionally characterized by high cost and low reliability. Recent developments in passively regenerated traps using fuel additive catalyzing agents have emerged as a lower cost alternate to conventional active regeneration trap systems.

In turbocharged heavy-duty diesel engines it is sometimes difficult to introduce EGR into the intake manifold because turbocharged intake manifold pressures are usually greater than exhaust system pressures. To circumvent this problem exhaust gas has been intercepted at a point upstream of the engine turbocharger where pressure is generally higher than that of the intake manifold. This approach is commonly referred to as high pressure loop (HPL) EGR.

While high pressure loop EGR applied to several heavy-duty diesel engines has been effective in reducing NOx to the 2.0 G/BHP-HR., diverting exhaust gas for EGR upstream of the turbocharger turbine reduces the exhaust gas energy available to drive the turbocharger. The penalty associated with such a system, is an increase in fuel consumption and an associated increase in particulate matter emissions. With a trap-based, after-treatment system, control of the particulate matter may be achieved; however, the fuel consumption penalty remained unresolved.

Another EGR configuration preserves turbocharger performance by supplying exhaust gas for recirculation from a point downstream of the turbocharger. At this location, exhaust gas pressure is at a lower level than that of the intake manifold and the EGR gas can be introduced in the system upstream of the turbocharger compressor. The pressure difference in such systems can be generally adequate for EGR flow rates needed to reduce NOx to the 2.0 G/BHP-HR level. This configuration is known as the low pressure loop (LPL) EGR system.

The advantages of the LPL EGR system over the HPL EGR system include:

1) Lower fuel consumption from that of the HPL configuration as a result of better turbocharger performance than that of the HPL configuration.
2) With the presence of a particulate trap, the LPL EGR supplies filtered exhaust with possible improved engine durability.
3) Because exhaust gas downstream of the trap is cooler than that provided from upstream of the turbocharger (as in the HPL case), LPL EGR would have a higher heat absorbing capacity for rates similar to those of the HPL EGR rates.
4) With cooler EGR there is a possibility of reducing the size of the EGR cooler and providing a more compact unit.
5) Reducing the EGR cooling requirement may help prevent exhaust system condensation and potential erosion of the turbocharger compressor wheel.
6) EGR and fresh charge air mixing may be improved by introducing the mixture upstream of the turbocharger compressor.

Diesel engines have an excellent appetite for the EGR at low idle and no load engine condition where they experience extremely high air-to-fuel (A/F) ratios relative to those of the gasoline engine. At peak torque and rated speed/full load diesel engine conditions, typical A/F ratios are 25 to 30:1, respectively. Therefore, it is desirable to avoid employing EGR at these conditions to reduce or prevent smoke formation.

Motor-assisted turbochargers have been used to improve internal combustion engine performance by supplementing the energy of the exhaust gas at low engine speed with electrical energy applied to an electric motor that assists the turbocharger turbine in driving the turbocharger charge air compressor. When there is a need for engine acceleration from low speed or an increased engine load, the electric motor can be energized and respond by increasing the turbocharger compressor's rotational speed, providing additional boost, and thus improving the engine's response at low speed and to increased loads. As engine speeds increase, for example, beyond peak torque speed, the engine turbocharger can develop the high boost required for the proper engine performance and low exhaust emissions, and the electric motor can be de-energized.

BRIEF SUMMARY OF THE INVENTION

The invention provides internal combustion engine systems and methods with enhanced engine performance through improved two-stage charge air compression and through improved exhaust gas recirculation in relation to engine load and speed.

Systems of the invention providing improved two-stage charge air compression include an internal combustion engine having an exhaust manifold and air intake manifold; a turbocharger having an exhaust gas turbine having its turbine inlet connected with the exhaust manifold and its turbine outlet connected with atmosphere, and an air compressor driven by said exhaust gas turbine and providing a flow of compressed air at its compressor outlet; and a motor-driven compressor having its inlet connected with the flow of compressed air from the turbocharger compressor outlet and its outlet connected with the intake manifold to provide further and highly compressed charge air for the internal combustion engine.

Such systems also include a control for the motor-driven compressor that can be connected with engine speed, engine throttle and engine load signals from the internal combustion engine and operate the motor-driven compressor to supply optimal compressed charge air in response to such engine signals, and can include a bypass check valve to provide a compressed air flow path around the motor-driven turbocharger when the turbocharger compressor is capable of supplying the charge air needs of the internal combustion engine and the motor-driven compressor is not energized.

Systems of the invention with exhaust gas recirculation and two-step charge air compression include internal combustion engines having an exhaust manifold and an intake manifold; a turbocharger with an exhaust gas turbine and a compressor, each having an inlet and an outlet; a first exhaust gas conduit connecting the exhaust gas turbine inlet with the exhaust manifold; a charge air conduit connecting the charge air compressor outlet with the intake manifold; a motor-driven compressor having an inlet and an outlet, with the outlet connected with the inlet of the turbocharger charge-air compressor; a two-input proportioning gas control valve having a first inlet open to atmosphere and a second inlet connected with a further EGR exhaust gas conduit connected with the outlet of the turbocharger turbine, and an outlet to deliver a mixture of air and exhaust gas to the inlet of the motor-driven charge air compressor; and a control operating the two-input proportioning gas control valve to mix in controlled proportions, air from atmosphere and exhaust gas from downstream of the turbocharger turbine for further compression of the mixture of air and exhaust gas for the intake manifold of the internal combustion engine.

Another preferred system of the invention with exhaust gas recirculation and two-stage charge air compression includes an internal combustion engine such as a diesel engine, including an exhaust manifold and an intake manifold; a turbocharger having an exhaust gas turbine and a turbine driven compressor, each having an inlet and an outlet; an intercooler having an inlet and an outlet; a first exhaust gas conduit connecting the exhaust gas turbine inlet with the exhaust manifold and a first compressed air conduit connecting the turbocharger compressor outlet with the intercooler inlet; a motor-driven air compressor having an inlet and an outlet, with its outlet connected with the intake manifold; a two input proportioning gas control valve having a first inlet connected with the intercooler outlet and a second inlet connected with a second exhaust gas conduit which is connected with the first exhaust gas conduit, and with its outlet connected with the inlet of the motor-driven charge air compressor; and a control operating the two-input proportioning gas control valve to mix in controlled proportions air from atmosphere and exhaust gas for further compression of the mixture of compressed air and exhaust gas for the intake manifold of the internal combustion engine.

Systems of the invention can include a bypass conduit and a check valve between the inlet and outlet of the motor-driven charge air compressor, an EGR gas cooler to provide cooled EGR exhaust gas to the second input of the two-input proportioning gas control valve, an EGR particulate filter or trap, and an intercooler for the compressed charge air.

Systems of the invention include a control provided with engine speed and engine load signals from the internal combustion engine and, if delivered, signals from an EGR mixture sensor, for example, signals related to the oxygen content of the recirculated exhaust gas and air mixture to be delivered to the intake manifold of the engine, and the control can be provided with algorithm for control of the two-input proportioning gas control valve to provide an optimal mixture of recirculated exhaust gas and air for operation of the internal combustion engine with reduced NOx, hydrocarbon and particulate emissions.

Systems of the invention can also include a motor-assisted turbocharger with an electric motor to assist the exhaust gas turbine in driving the charge air compressor, and the control can operate the motor-driven compressor and the assisting electric motor of the turbocharger to provide two-stage compression at lower engine speeds below engine torque peak speed and in response to accelerator demands and increased loads for the internal combustion engine where the exhaust gas energy of the internal combustion engine may not be sufficiently high for the engine's charge air needs.

The invention also provides a method of operating an internal combustion engine with exhaust gas recirculation and two-stage compression of its charge air comprising: intercepting a flow of exhaust gas from a turbocharger exhaust gas outlet, directing the flow of exhaust gas for mixing, providing a flow of air for mixing with the exhaust gas, mixing the flows of air and exhaust gas in controlled proportions into a mixture of exhaust gas and air, controlling proportions of air and exhaust gas in the mixture, compressing the mixture of exhaust gas and air, directing the compressed mixture of exhaust gas and air to the input of the turbocharger compressor, and further compressing the compressed mixture of exhaust gas and air with the turbocharger compressor and directing the resulting further compressed mixture to the intake manifold of the internal combustion engine.

The preferred operating method of the invention comprises intercepting a flow of exhaust gas from the exhaust manifold of an internal combustion engine, directing the exhaust gas for mixing, providing a flow of compressed air for mixing with the exhaust gas, mixing the flows of compressed air and exhaust gas in controlled proportions into a mixture of exhaust gas and compressed air, controlling the proportions of compressed air and exhaust gas in the mixture, directing the mixture of exhaust gas and compressed air to the input of a motor-driven compressor, and further compressing the mixture of exhaust gas and compressed air and directing the resulting compressed mixture to the intake manifold of the internal combustion engine.

In methods of the invention, the flows of air and exhaust gas are compressed and controlled in mixing to provide an optimal reduction of NOx and particulate matter in the exhaust gas of the internal combustion engine, and such methods can include the further steps of sensing engine speed, determining when the engine is operating below peak torque speed, sensing engine loading and reducing the exhaust gas proportion in the mixture as the engine loading increases. The methods can include the further step of terminating the compression of a substantially all air mixture by the motor-driven compressor as charge air for the internal combustion engine at high engine speeds. In methods of the invention, the recirculated exhaust gas is preferably cooled before its mixing with air and may be filtered to remove particulate matter.

Methods of the invention further feature operation of a motor-driven compressor and an assisting electric motor of a motor-assisted turbocharger at low engine speeds below peak torque engine speed and in response to accelerator demands and demands for increased load.

Other features and advantages of the invention will be apparent to those skilled in the art from the drawings and more detailed description of the invention that follows.

BRIEF DESCRIPTION OF THE INVENTION

FIG. 3 illustrates such a system where the second stage of compression is effected by the turbocharger compressor, and FIG. 4 illustrates a system, like the system of FIG. 3 but in which the second stage of compression is obtained from a motor-assisted turbocharger compressor;

FIG. 5 illustrates such a system with a turbocharger compressor effecting the first stage of compression, and FIG. 6 illustrates such a system in which a motor-assisted turbocharger effects the first stage of compression.

DETAILED DESCRIPTION OF THE BEST MODE OF THE INVENTION

FIGS. 1–6 illustrate internal combustion engine systems of the invention in which the same elements in each of the different systems have the same element numbers to better illustrate differences in the systems. Those skilled in the art will understand that although identically numbered elements provide generally the same function in each of the illustrated systems, they may have different designs for efficient and reliable operation in the different systems.

Figure 1:
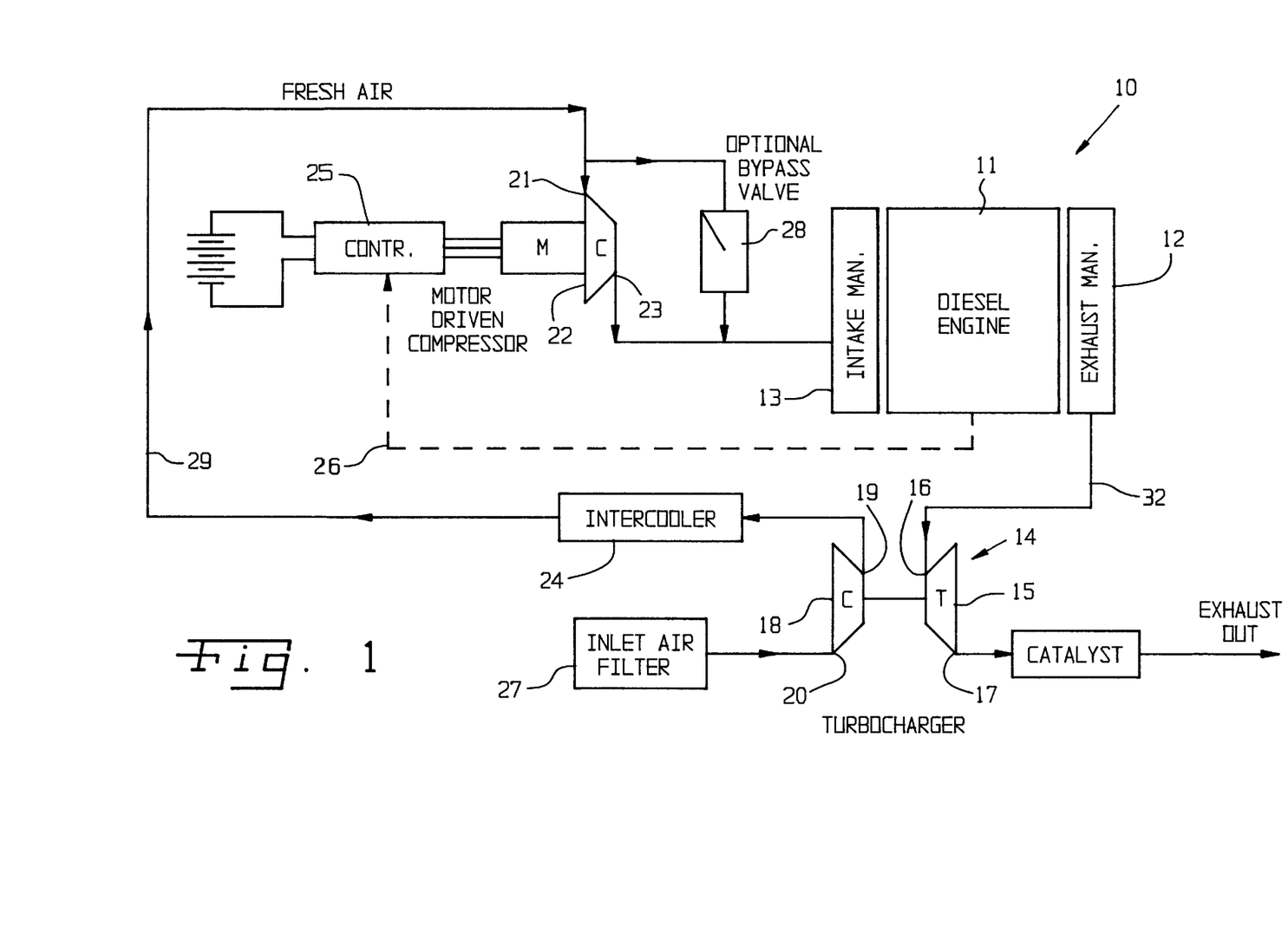
FIG. 1 illustrates a system of the invention with improved two-stage compression of charge air for an internal combustion engine.
Figure 2:
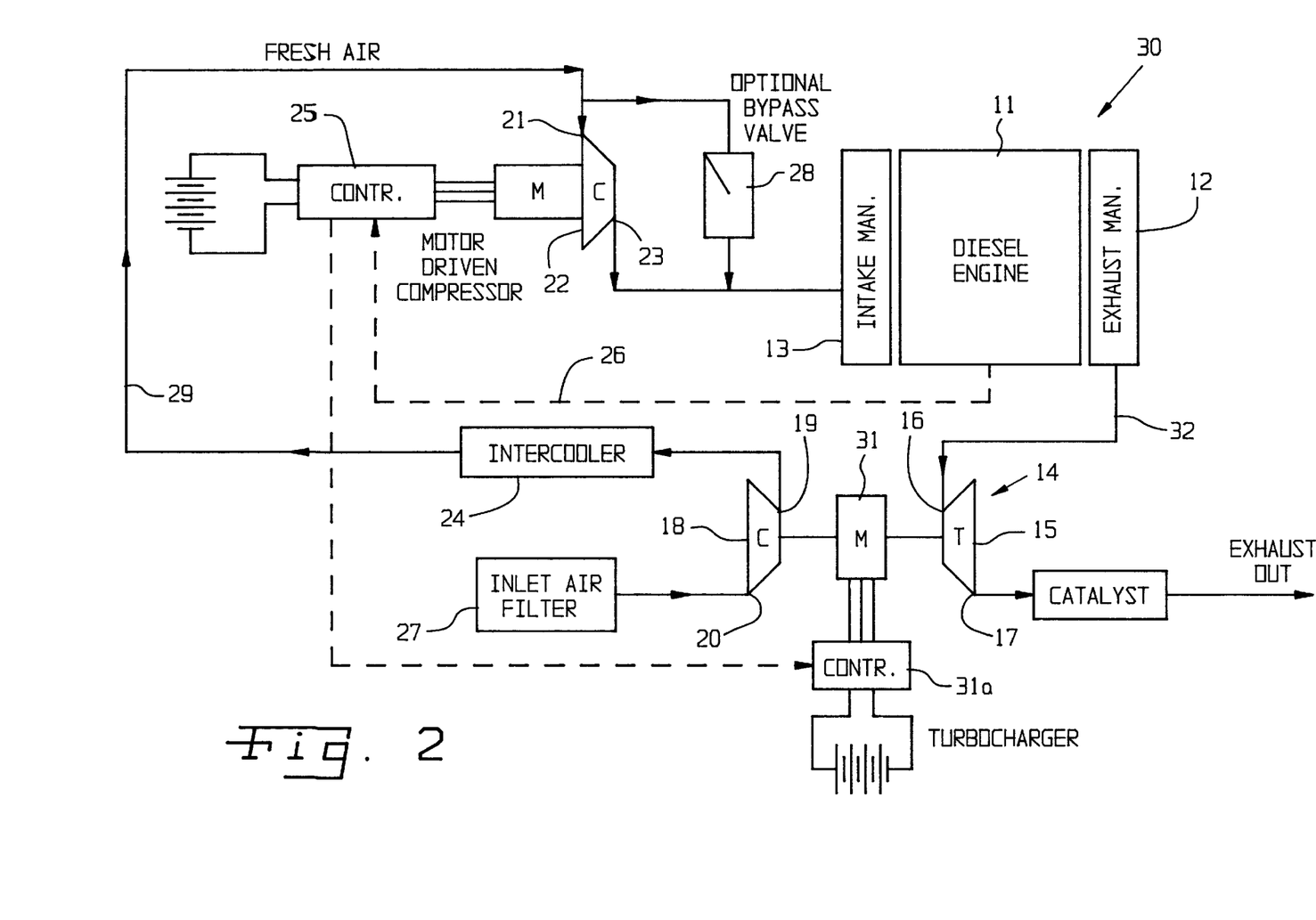
FIG. 2 illustrates a system of the invention, like the system of FIG. 1 except the turbocharger compressor providing the first stage of compression is assisted by an electric motor.

FIGS. 1 and 2 illustrate internal combustion engine systems with two stage compression of charge air delivered to the intake manifold of the internal combustion engine.

The internal combustion engine system 10 of FIG. 1 includes an internal combustion engine 11 having an exhaust manifold 12 and an intake manifold 13, and a turbocharger 14 having an exhaust gas turbine 15, with its inlet 16 connected with the exhaust manifold 12 and its outlet 17 connected with atmosphere, and an air compressor 18 driven by the exhaust gas turbine 15 to provide a flow of compressed air at its outlet 19. The flow of compressed air from the turbocharger compressor outlet 19 is delivered by compressed air conduit 29 to the inlet 21 of a motor-driven compressor 22 for further compression of the charge air upon energization of the motor-driven compressor. The outlet 23 of the motor-driven compressor 22 is connected with the intake manifold 13 of the internal combustion engine 11.

In the system of FIG. 1, operation of the turbocharger compressor 18 provides a first stage of charge air compression, and the simultaneous operation of the motor-driven compressor 22 provides a second stage of compression of the engine charge air. Because the motor-driven compressor 22, operating as a second stage compressor, operates on compressed air, it may be made substantially smaller and more compact and be designed for operation at high rotational speeds and substantially improved efficiencies. As illustrated in FIG. 1, a charge air intercooler 24 may be provided after the first stage of compression, i.e., between the outlet 19 of the turbocharger compressor 18 and the inlet 21 of the motor-driven generator 22.

As illustrated in FIG. 1, the system 10 includes a control 25 for the motor-driven generator 22 connected by electrical connection 26 with one or more signal outputs from the internal combustion engine 11. Sensors and other signal generators operating at the internal combustion engine can provide signals of engine speed, throttle position and demands for engine acceleration and engine load. Control 25, in response to such signals, can operate the motor-driven generator to supply increased charge air boost when needed by the internal combustion engine.

Thus, in operation of the system of FIG. 1 air is induced from atmosphere with the turbocharger compressor 18, preferably through an inlet air filter 27. The turbocharger compressor 18 delivers compressed air to an intercooler 24 from which it flows to the inlet 21 of a motor-assisted compressor 22. The motor-assisted compressor 22 adds a second stage of compression to the charge air and delivers it to the intake manifold 13.

An optional bypass/check valve 28 can be installed to provide an alternate flow path for the charge air during intervals when it may be advantageous to de-energize the motor-driven compressor 22.

The motor-driven compressor 22 can be energized by control 25 at low idle speeds of the engine to supply a significant additional charge air boost pressure in preparation for engine acceleration. When the engine throttle is opened to accelerate the engine 11, the motor-driven compressor 22 can be super-energized by control 22, for example, by applying increased electric power applied to its motor, to eliminate turbolag, thereby supplying the engine cylinders with a greater air charge than turbocharger 14 could supply unassisted. This greater air charge during acceleration of the engine 11 from low idle can be utilized to produce more power over the low-speed range of the engine, or it can be utilized to reduce objectionable emissions during the acceleration period.

When the engine 11 is called upon to produce full power at high engine speed, the motor-driven compressor 22 can be energized to provide second stage compression and an increased charge air boost. When the engine 11 is running at high speed but low load, the motor-driven compressor 22 can be de-energized since the turbocharger can supply an adequate charge air boost and the second stage of compression is not needed at this time.

Another system 30 of this invention is illustrated diagrammatically in FIG. 2. The system shown in FIG. 2 is the same as that of FIG. 1, except that an assisting electric motor 31, which, for example, can be incorporated into a motor-assisted turbocharger, is used to assist the exhaust gas turbine 15 in driving the turbocharger compressor 18. By using a motor-assist in the turbocharger 14 at low engine speeds to augment the boost pressure that can be produced by the motor-assisted compressor 22, a very high charge air pressure can be created in the intake manifold 13 at low engine speeds in preparation for engine acceleration. System 30 of FIG. 2 can provide a more effective and flexible two-stage charge air system with substantially higher charge air over the low-speed range of the engine up to peak torque speed. By adding engine fuel to utilize the higher charge air pressure, much higher engine power can be produced with low emissions, thereby making the engine much more responsive to sudden load changes.

Figure 3:
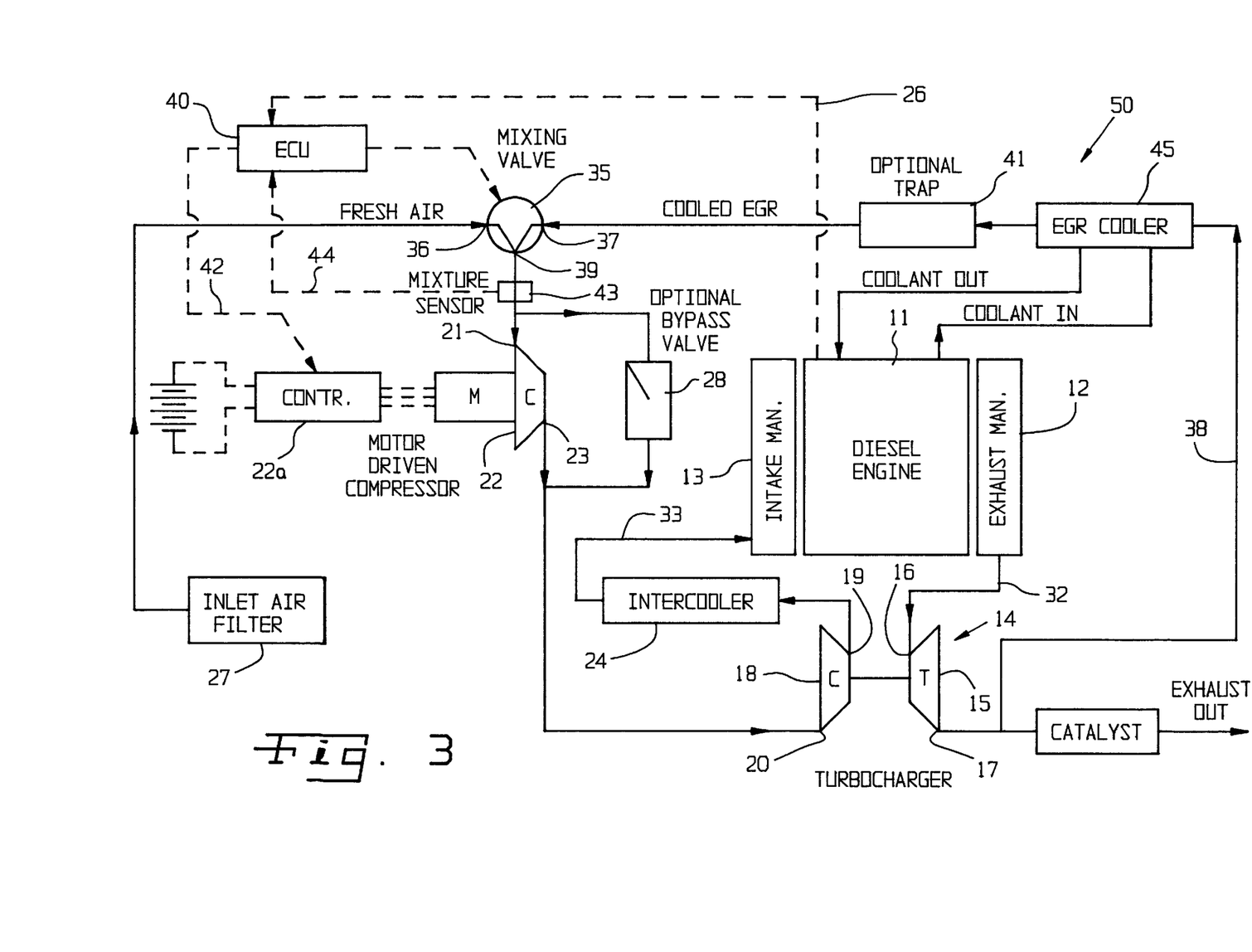
FIGS. 3 and 4 illustrate systems of the invention with low pressure level exhaust gas recirculation from the outlet of the internal combustion engine turbocharger turbine (LPL EGR) and two-stage compression of the charge air for the internal combustion engine.
Figure 4:
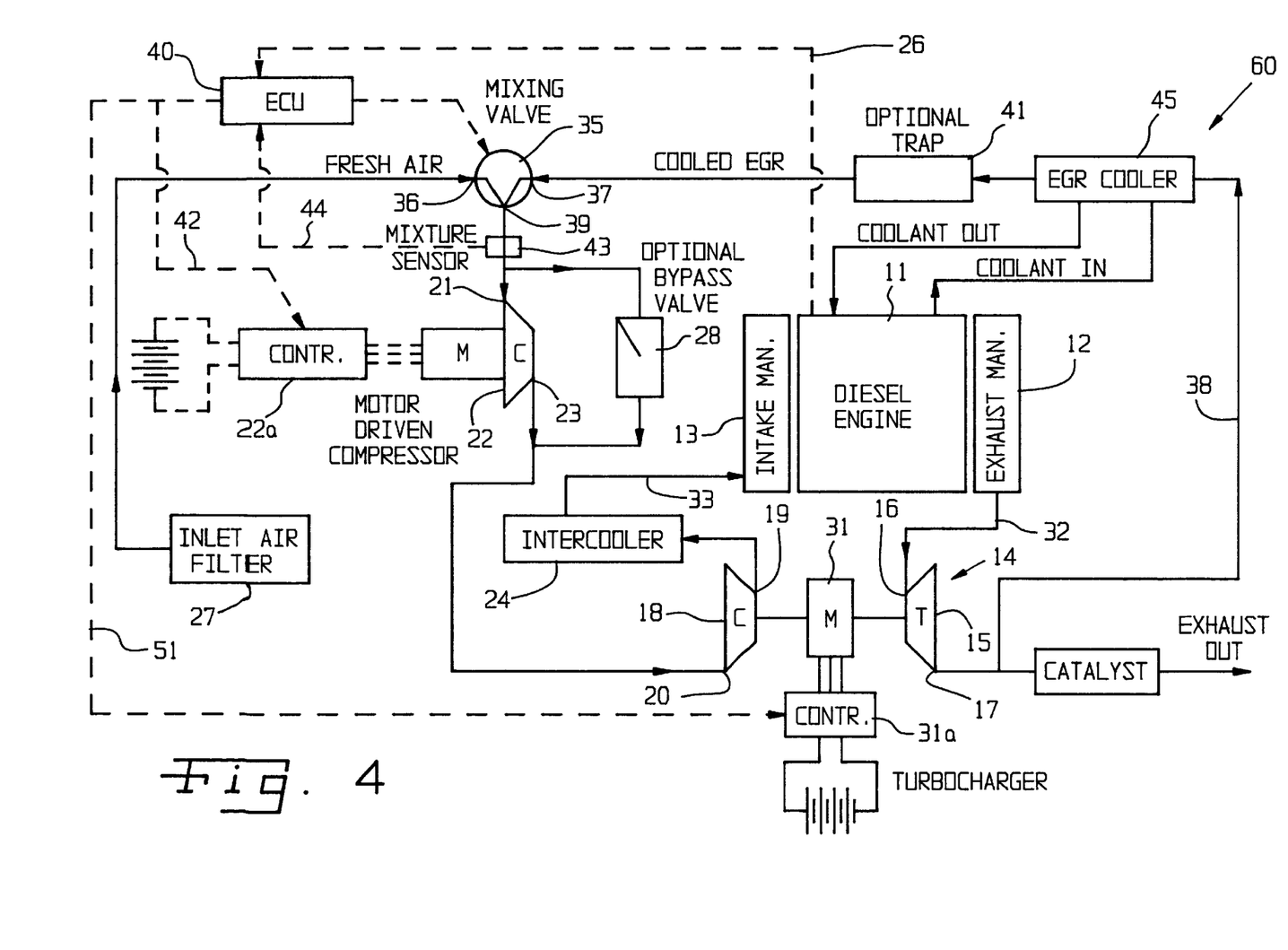

FIGS. 3 and 4 illustrate systems with two-stage charge air compression and low pressure level exhaust gas recirculation.

The systems of FIGS. 3 and 4, that is, system 50 of FIG. 3, and system 60 of FIG. 4, each include: a diesel engine 11 including an exhaust manifold 12 and an intake manifold 13; a turbocharger 14 having an exhaust gas turbine 15 with an inlet 16 and an outlet 17, and a charge air compressor 18 with an outlet 19 and inlet 20; an exhaust gas conduit 32 connecting the exhaust gas turbine inlet 16 with the exhaust manifold 12 and a charge air conduit 33 connecting the charge air compressor outlet 19 with the intake manifold 13, preferably through an intercooler 24; a motor-driven compressor 22 having an inlet 21 and outlet 23 with its outlet 23 being connected with the inlet 20 of the charge air compressor 18; a two-input proportioning gas control valve 35 having a first inlet 36 open to atmosphere, and a second inlet 37 connected with a further exhaust gas conduit means 38 to deliver exhaust gas from the turbocharger exhaust gas turbine outlet 17, and an outlet 39 connected with the inlet 21 of the motor-driven compressor 22; and a control 40 to operate the two-input proportioning gas control valve 35 to mix in controlled proportions air from atmosphere and exhaust gas from the turbocharger exhaust gas turbine outlet 17 and admit the mixture to the inlet 21 of the motor-driven charge air compressor 22.

Since the systems of FIGS. 3 and 4 intercept the flow of exhaust gas downstream of the turbocharger turbine outlet at lower pressures than at the exhaust manifold, the systems of FIGS. 3 and 4 provide what has been referred to as low pressure level exhaust gas recirculation.

The control 40, which is preferably a microprocessor-based control, is provided with engine operation signals over an electrical connection 26 from sensors and signal generators, for example, for engine speed and engine throttle and load demands at the internal combustion engine. The control 40 can operate the motor-driven compressor 22, through a connection 42 and a power controller 22a for its motor to provide charge air compression when needed, as at low engine speeds and in response to acceleration demands and increased loads and to the need for increased air to reduce objectionable emissions. Systems of the invention can include a mixture sensor 43 downstream of the gas control valve 35 to determine the percentage of exhaust gas present in the mixture being controlled. The signal from the mixer sensor 43 can be connected to the control 40 over a connection 44 so that the gas control valve 35 can be adjusted to provide a preprogrammed proportion of exhaust gas in the mixture, depending upon engine load and speed. For example, the mixture sensor 43 may be an oxygen sensor that measures the percentage of oxygen in the mixture downstream of the gas control valve 35. The amount of oxygen present in the mixture downstream of the mixing valve 35 is indicative of the amount of exhaust gas in the mixture. If there is no exhaust gas in the mixture, such a sensor will measure approximately 20 percent oxygen; and if the mixture contains about 10 percent of exhaust gas, the oxygen in the mixture will be reduced to about 18 percent. So if the engine is running at low idle and requires about 10 percent exhaust gas in the mixture to control objectionable emissions, the oxygen sensor can measure the oxygen content of the mixture, relay its signal to the control 40 which in turn can adjust the gas control valve 35 to a position where the mixture contains the desired percentage of exhaust gas.

The amount of exhaust gas required in the charge air mixture to limit objectionable emissions, such as NOx, HC and particulate matter, to predetermined levels can be determined by laboratory testing of an engine over its entire speed and load range. The amount of exhaust gas needed in the charge air mixture at various speeds and loads can then be programmed into the microprocessor of the control 40, along with the oxygen content corresponding to various percentages of exhaust gas in the charge air mixture. When the control 40 receives signals of engine speed and load, it can then position the mixing valve 35 so that the predetermined amount of EGR gas is present in the charge air mixture being fed to the engine intake manifold. The motor-driven compressor 22 can increase the pressure of the mixture of exhaust gas and air for delivery to the intake manifold 13 at low idle speeds, during acceleration of the engine from low idle speeds and at other desirable times. When the turbocharger 14 is supplied with enough exhaust gas energy to be able to supply sufficient charge air to the engine by itself, the motor-driven compressor 22 can be de-energized and bypassed, if necessary or desirable, through the bypass check valve 28.

Figure 5:
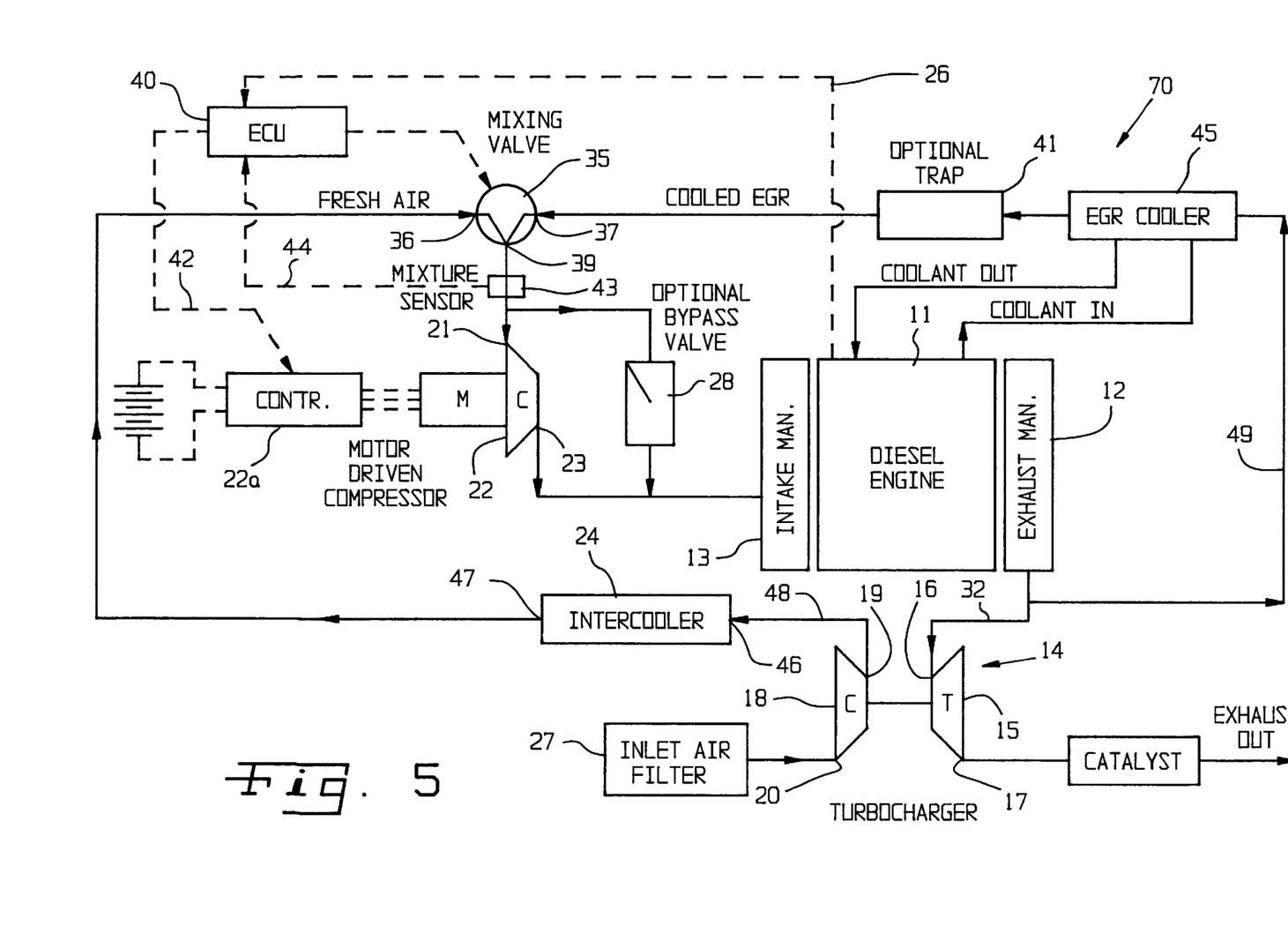
FIGS. 5–6 illustrate preferred systems of the invention with high pressure level exhaust gas recirculation from the exhaust manifold (HDL EGR) and two-stage compression of the charge air for the internal combustion engine.
Figure 6:
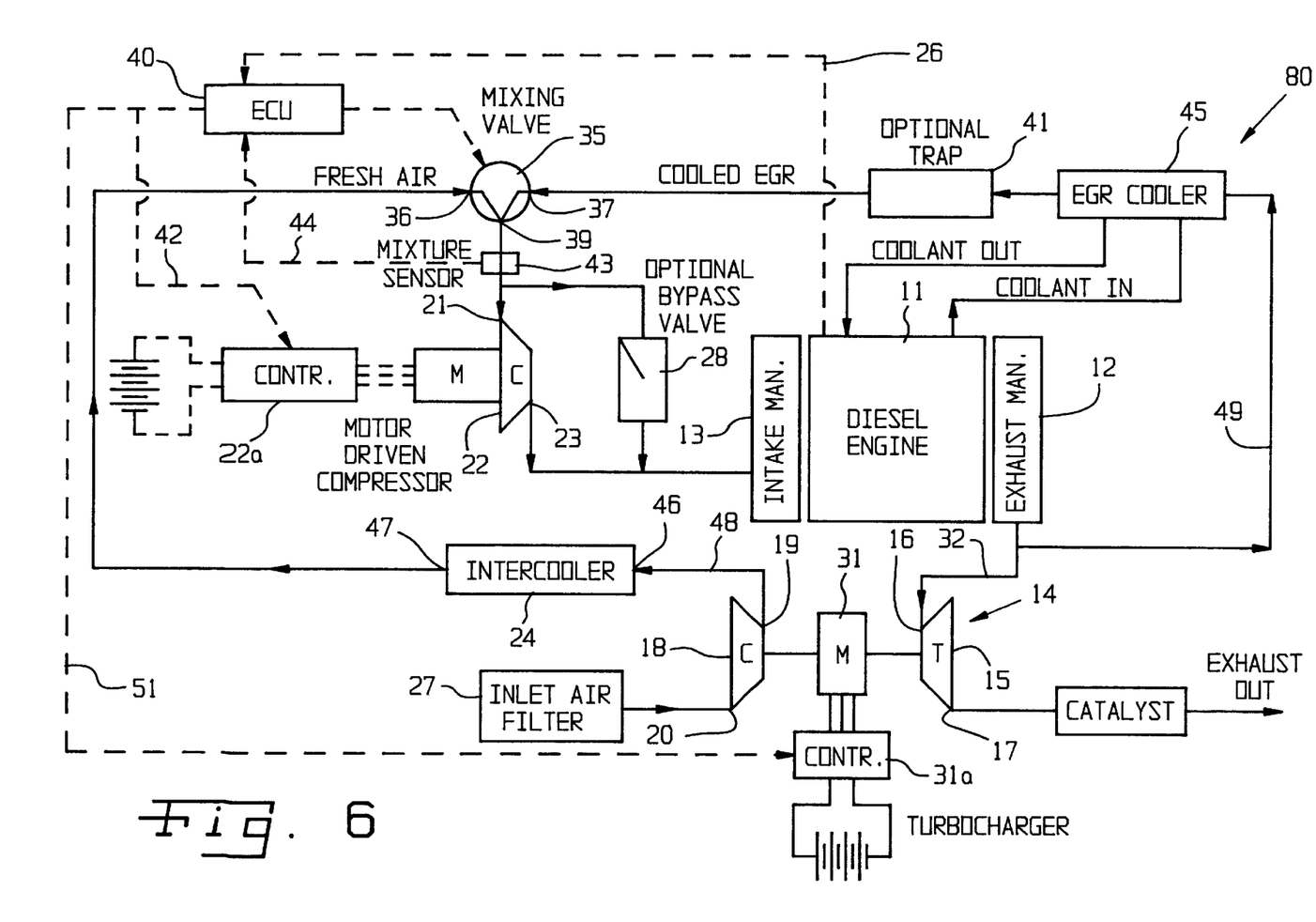

FIGS. 5 and 6 illustrate preferred systems 70 and 80 of the invention including motor-driven compressors providing the second stage of two-stage charge air compression for the internal combustion engine.

The preferred systems 70, 80 of FIGS. 5 and 6 include an internal combustion engine 11 having an exhaust manifold 12 of the intake manifold 13; a turbocharger 14 having an exhaust gas turbine 15 with an inlet 16 and an outlet 17 and exhaust gas driven compressor 18 with an outlet 19 and an inlet 20; an intercooler 24 having inlet 46 and an outlet 47; a first exhaust gas conduit 32 connecting the exhaust gas turbine inlet 16 with the exhaust manifold 12; a first compressed air conduit 48 connecting the turbocharger compressor outlet 19 with the intercooler inlet 46; a two-input proportioning gas control valve 35 having a first inlet 36 connected with the outlet 47 of the intercooler 24, and a second inlet 37 connected with a second exhaust gas conduit 49 connected to the first exhaust gas conduit 32, and an outlet 39 for mixed exhaust gas and air; a motor-driven charge air compressor 22 having an inlet 21 connected with the outlet 39 of the two input proportioning gas control valve 35 and an outlet 23 connected with the intake manifold 13; and a control 40 operating the gas control drive 35 to mix in controlled proportions compressed air from the first stage of compression and exhaust gas from the exhaust gas manifold and admit the mixture to the input 21 of the motor-driven charge air compressor 22.

In operation of the systems of FIGS. 5 and 6, fresh air is induced from atmosphere, preferably through an inlet air filter 27 by the turbocharger compressor 18 and delivers it to the intercooler 24 from which is directed to one input 36 of the two-input proportioning gas control valve 35, the second input 37 being exhaust gas from the EGR exhaust gas conduit 49. In the system of FIGS. 5 and 6, the EGR exhaust gas is taken from the engine exhaust system upstream of turbocharger 19 before expansion through the turbocharger turbine 15 has taken place. Thus, the exhaust gas being recirculated in the systems of FIGS. 5 and 6 is at a higher pressure than that of the exhaust gas being recirculated in systems of FIGS. 3 and 4. The EGR gas is routed through an EGR cooler 45 that reduces its temperature to a desirable level before its mixing with the compressed air by gas control valve 35. If desired, a particulate trap 41 may be employed somewhere in the exhaust gas conduit 49 carrying the EGR gas. In the systems of FIGS. 5 and 6, the motor-driven compression 22 is located downstream of the turbocharger compressor 18 and acts as the second stage in the two-stage compressor system.

The systems of FIGS. 5 and 6 provide control of both EGR and power augmentation of the internal combustion engine. Exhaust gas recirculation is provided from a point after the turbocharger turbine and can be supplied through an EGR cooler 45 to reduce its temperature and increase its emission reduction effectiveness. The two-input proportioning gas control valve 35 then serves as a junction point between the cooled EGR gas and fresh filtered air. The gas control valve 35 controls the charge mixture supplied to the motor-driven generator 22, and the mixture effected by the gas control valve 35 depends upon the internal combustion engine and its operating conditions and the desired rate of the exhaust gas recirculation for a given emission reduction. At low idle speed and in impartial load conditions for the internal combustion engine the gas control valve 35 will allow a mixture of fresh air and exhaust gas into the motor-driven compressor 22, the proportions of the mixture being determined by the emission reduction algorithm for the internal combustion engine and its operating conditions. At speeds below peak torque speed and as the load increases, the gas valve control 35 will gradually reduce proportion of exhaust gas in the mixture and increase the proportion of air to the point where substantially 100 percent air is provided by the gas control valve 35 to the motor-driven compressor 22 at full engine load conditions. In addition, the motor-driven compressor 22 can be operated by the control 40 to provide increased charge air to the internal combustion engine 11 at low engine speeds when the internal combustion engine operator demands engine acceleration and when the load on the internal combustion engine increases. Thus, combined control of the gas control valve 35 and the motor-driven generator 22 can improve both engine performance and engine emissions at speeds below peak torque speed.

Above peak torque speed, the turbocharger 14 can usually be well matched to the engine charge air requirements for smoke control; therefore, in systems of the invention, the motor-driven generator 22 may be used only at engine speeds below those of peak torque speed; however, it provides the capability of providing low emission operation under a variety of engine operating conditions.

As indicated in FIGS. 1–6, the motor-driven compressor 22 may be provided with a bypass including a check valve 28 for operation of the system at engine full load conditions and at speeds above peak torque speed where the motor-driven generator 22 will usually be inoperative. The bypass for the motor-driven generator is preferably provided to avoid potential flow restrictions that might caused by an inoperative motor-driven compressor 22 at full load conditions, permitting fresh air, or a mixture of EGR gas and fresh air to proceed to the intake manifold 13 without substantial restriction by the motor-driven generator 22.

Systems of the invention can alleviate problems caused by solid particulate matter, such as insoluble or carbonous matter, and its adverse effect on the two-stage compressors and intercooler that deliver the exhaust gas recirculation mixture to the intake manifold by operating the motor-driven generator 22 to provide adequate fresh air to compensate for any drop in the air fuel ratio during engine operation and thereby avoid soot formation.

In the embodiments of FIGS. 3 and 4, the exhaust gas for recirculation is taken from a location downstream of the turbocharger turbine 15 by the further exhaust gas conduit 38 and routed through an exhaust gas recirculation cooler 45, and if desired, a particulate removal means 41. Fresh air enters from atmosphere through an air intake filter 27 and flows to the proportioning gas control valve 35 where it is combined with EGR gas in proportions to control the formation of objectionable engine emissions. The motor-driver compressor 22 is energized to compress the fresh air-EGR gas mixture and deliver it to the input 20 of a turbocharger compressor 18 and at a pressure level above atmospheric pressure. Thus, in the systems of FIGS. 3–4 the motor-driven compressor 22 functions the first stage compressor in a two-stage compressor system and supplies the engine 11 with boost pressure during acceleration that is much higher than the turbocharger compressor 18 could supply without such assistance.

By using the motor-driven compressor as a second stage of compression in the systems of FIGS. 5 and 6, the turbocharger compressor 18 and the intercooler 24 remain free of contamination from particles that may be present in recirculated exhaust gas (EGR gas). In addition, the motor-driven compressor 22 can be energized at high engine speed and load to act as a second stage compressor during time when little or no EGR gas is needed for good emission control. In this case, a portion of the power needed to supply the engine 11 with high boost pressure is supplied from the engine electrical system. This can allow a turbine casing with a larger throat area to be used in the engine turbocharger and lower the back pressure on the engine cylinders, resulting in less pumping loss during the exhaust stroke of the piston, and improved engine fuel consumption.

FIG. 6 illustrates a system that is identical to that of FIG. 5, but includes the addition an assisting motor 31 which is operable to drive the turbocharger compressor 18 by control 40 (and a power motor control 31*a* if desirable) to supplement the pressure available at the first stage of compression from the energy of the exhaust gas alone, and provide charge air pressures, particularly low at idle speeds and during acceleration from low idle. Thus, operation of both the assisting motor 31 at the first stage of compression and the motor-driven compressor 22 can provide a substantially increased boost to the internal combustion engine when it is needed.

Systems of the invention can thus operate an internal combustion engine by intercepting a flow of exhaust gas from a turbocharger turbine output of the internal combustion engine, directing the flow of exhaust gas for mixing, providing a flow of air for mixing with the exhaust gas, mixing the flows of air from exhaust gas in controlled proportions into a mixture of exhaust gas and air, controlling proportions of exhaust gas in the air and the mixture, compressing the mixture of exhaust gas and air, directing the compressed mixture exhaust gas and air to a second stage compressor and further compressing the compressed mixture exhaust gas and air and directing the resulting further compressed mixture as charge air for an internal combustion engine.

A preferred method of operating an internal combustion engine includes steps of intercepting a flow of exhaust gas from the exhaust manifold of an internal combustion engine, directing the exhaust gas for mixing, providing a flow of compressed air for mixing with the exhaust gas, mixing the flows of compressed air and exhaust gas in controlled proportions in a mixture of exhaust gas and compressed air, controlling the proportions of compressed air and exhaust gas in the mixture, directing the mixture of exhaust gas and compressed air to a second stage compressor and further compressing the mixture of exhaust gas and compressed air and directing the resulting further compressed mixture as charge air to the internal combustion engine.

In methods of the invention, the flows of air and exhaust gas are controlled in mixing to provide an optimal reduction of NOx in the exhaust gas of the internal combustion engine. The method further includes the steps of sensing engine speed, determining when the engine is operating below peak torque speed, sensing engine loading, and reducing the proportion of exhaust gas in the EGR mixture as engine loading increases to a point where the mixture is substantially all air at full engine loading. In methods of the invention, the compression of the substantially all air mixture can be terminated by a control.

As noted above, methods of the invention include interception of the exhaust gas at substantially the pressures of the exhaust gas manifold, providing high pressure level exhaust gas recirculation (HPL EGR) and after the exhaust gas has expanded through a turbocharger turbine at substantially lower pressures, providing low pressure level exhaust gas recirculation (LPL EGR).

The system's invention disclosed in FIGS. 1–6 all provide two-stage compression of the charge air for the internal combustion engine. In the systems of FIGS. 3 and 4 the first compression stage is provided by the motor-driven generator 22 and the second stage of compression is provided by the charge air compressor 18 of the turbocharger 14, and in the systems of FIGS. 1, 2, 5 and 6 the first stage of compression is provided by the charge air compressor 18 of a turbocharger 14, and the second stage of compression is provided by a motor-driven compressor 22. As indicated in FIGS. 4 and 6, turbocharger 14 may be provided with an assisting electric motor 31 operable to drive the turbocharger compressor 18 when engine operating conditions do not provide sufficient exhaust gas energy to rotate the turbocharger turbine and compressor wheel at rates providing the charge air needed by the internal combustion engine, to provide the needed charge air boost, and to help meet exhaust gas emission requirements. Those skilled in the art will recognize that while the systems of FIGS. 1–6 include a turbocharger to provide one of the stages of charge air compression, two-stage compression can be provided through the use of only electrical energy, for example, by placing the turbochargers in the systems of FIGS. 1–6 with a second motor-driven compressor. Where a second motor-driven compressor is used in the system, interception of EGR exhaust gas from the exhaust manifold may require a gas diverter valve or other intercepting means if the downstream exhaust gas flow restriction is insufficient to provide a sufficient exhaust gas recirculation in the exhaust gas conduit means.

The drawings and description above are directed to those embodiments of the invention that are currently believed to be preferred; however, those skilled in the art will recognize that the invention may be embodied in other systems and embodiments without departing from the scope of the invention as set forth in the following claims.

We claim:

1. An internal combustion engine system, comprising an internal combustion engine including an exhaust manifold and an intake manifold;

a turbocharger having an exhaust gas turbine with an input and an output and a compressor with an input and an output;

an intercooler having an input and an output;

a first exhaust gas conduit connecting the exhaust gas turbine input with the exhaust manifold, and a first compressed air conduit connecting the turbocharger compressor output with the intercooler input;

a motor-driven charge air compressor having an input and an output with its output connected with the intake manifold;

a two-input proportioning gas control valve having a first input connected with the intercooler output and a second input connected with a second exhaust gas conduit which is connected with the first exhaust gas conduit, and having an output connected with the input of said motor-driven charge air compressor; and a control, said control operating said two input proportioning gas control valve to mix in controlled proportions compressed air and exhaust gas from said exhaust manifold and admit the mixture to the input of motor-driven charge air compressor.

2. The system of claim 1 further comprising a bypass conduit and check valve between the input and output of the motor-driven charge air compressor.

3. The system of claim 1 further comprising an exhaust gas cooler connected in the second exhaust gas conduit to provide a cooled flow of exhaust gas to said second input of said two-input proportioning gas control valve.

4. The system of claim 3 wherein said exhaust gas cooler is connected with a coolant of said internal combustion engine.

5. The system of claim 1 wherein said control includes algorithm for calculation of proportions of exhaust gas and air needed for NOx reduction in the exhaust gas of the internal combustion engine.

6. The system of claim 1 wherein said system includes a mixture sensor and the control is connected with the mixture sensor.

7. The system of claim 1 wherein the system includes signal generators for engine speed, accelerator demand and engine load and the control is connected with said signal generators.

8. The system of claim 7 wherein the control operates the motor-driven compressor in response to engine speed, accelerator demand and engine load signals.

9. The system of claim 1 wherein said second exhaust gas conduit includes a particle removal means.

10. The system of claim 1 further comprising an electric motor operable to assist driving the turbocharger compressor, said electric motor being connected with and controlled by the control.

11. The system of claim 10 wherein said control is connected with signal generators for engine speed, acceleration demand and engine load, and operates the motor-driven generator and the electric motor assisting the turbocharger in response to signals from said signal generators.

12. A method of operating an internal combustion engine with a turbocharger, comprising intercepting a flow of exhaust gas from the internal combustion engine, directing the flow of exhaust gas for mixing, providing a flow of compressed air from said turbocharger for mixing with the exhaust gas, mixing the flows of compressed air and exhaust gas in controlled proportions into a mixture of exhaust gas and compressed air, controlling the proportions of compressed air and exhaust gas in the mixture by sensing engine speed, determining when the engine is operating below peak torque speed, sensing engine loading, and reducing the proportion of exhaust gas in the mixture as the engine loading increases, directing the mixture of exhaust gas and compressed air to the input of a motor-driven compressor, and compressing the mixture of exhaust gas and compressed air and directing the resulting compressed mixture as charge air for the internal combustion engine.

13. The method of claim 12 wherein the flows of compressed air and exhaust gas are controlled in mixing to provide an optimal reduction of NOx in the exhaust gas of the internal combustion engine.

14. The method of claim 13 wherein the mixture is substantially all compressed air at full engine loading.

15. The method of claim 14 including the further step terminating the compression of the substantially all air directed as charge air for the internal combustion engine.

16. The method of claim 12 wherein a flow of exhaust gas is directed to an exhaust gas turbine of said turbocharger and is intercepted in its flow between the internal combustion engine and the exhaust gas turbine to provide said flow of exhaust gas for mixing.

17. The method of claim 12 wherein the intercepted flow of exhaust gas is cooled before mixing with the flow of air.

18. The method of claim 12 further comprising the step at removing particulates from the intercepted flow of exhaust gas before mixing with the flow of air.

19. An internal combustion engine system, comprising an internal combustion engine including an exhaust manifold and an intake manifold;

a turbo charger having an exhaust gas turbine with an input and an output and charge air compressor with an input and an output;

a first exhaust gas conduit connecting the exhaust gas turbine input with the exhaust manifold for driving the charge air compressor;

a motor-drive n compressor having an input and an output;

a two-input proportioning gas control valve having an output, a first input and a second input connected with the exhaust gas output of the exhaust manifold;

charge air conduit means connecting the turbocharger charge air compressor, the motor-driven compressor and the first input of the two-input proportioning gas valve in series with the intake manifold of the internal combustion engine, and a control, said control operating said two-input proportioning gas control valve to mix in controlled proportions air and exhaust gas from said exhaust manifold for direction to the intake manifold of the internal combustion engine.

* * * * *